April 6, 1965  J. C. SCHMERTZ  3,176,509
TEMPERATURE COMPENSATED SPRINGS
Filed June 28, 1963  2 Sheets-Sheet 1
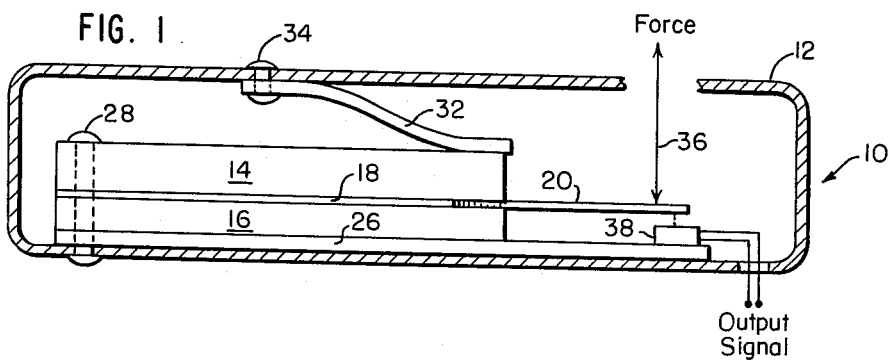
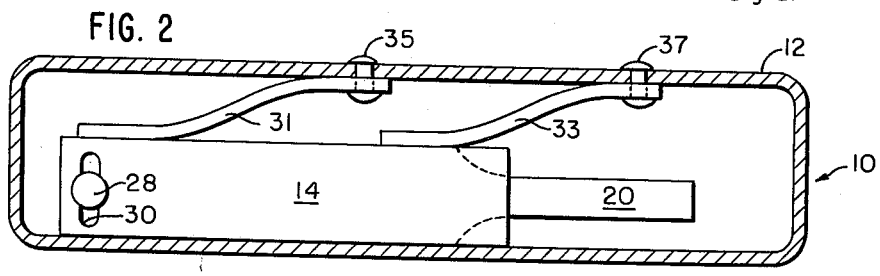
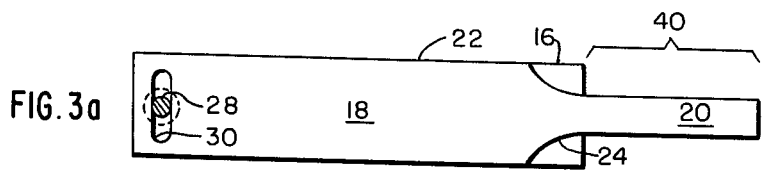
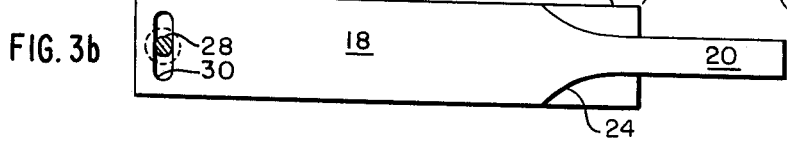
INVENTOR.
JOHN C. SCHMERTZ
BY
ATTORNEYS April 6, 1965 J. C. SCHMERTZ 3,176,509
TEMPERATURE COMPENSATED SPRINGS
Filed June 28, 1963 2 Sheets-Sheet 2

INVENTOR.
JOHN C. SCHMERTZ
BY Kenway, Jenney & Hildreth
ATTORNEYS

United States Patent Office 3,176,509
Patented Apr. 6, 1965

3,176,509
TEMPERATURE COMPENSATED SPRINGS
John C. Schmertz, Pittsburgh, Pa., assignor, by mesne assignments, to the United States of America as represented by the Secretary of the Air Force
Filed June 28, 1963, Ser. No. 291,506
7 Claims. (Cl. 73—141)

My invention relates to springs and spring devices for compensating for the variation in rigidity of a spring subject to temperature changes. In particular my invention concerns temperature compensated spring devices adapted and intended for use in high temperature instruments where force, pressure, or acceleration is measured by employing the stiffness of a spring.

It is well known that the stiffness of a spring will vary with temperature, because of the variation of material stiffness with temperature. If a constant force is applied to a spring at room temperature, the spring will deflect by a certain amount, and this deflection may be used as a measure of the applied force. If the temperature is then changed, the deflection will change, due to the effect of temperature on material stiffness, and thus a different deflection will be obtained for the same applied force. This difference in force measurement may be called a temperature-induced error.

A number of techniques have been employed to minimize this type of temperature-induced error. Some techniques allow the spring stiffness to change with temperature, but correct the temperature induced error by external means. Other techniques strive to minimize or compensate for the variation of spring stiffness with the change in temperature. One method has been to develop spring materials which exhibit reduced variation in stiffness with temperature. Another method has been developed in which strips of ordinary carbon steel, whose stiffness decreases with temperature, are laminated to strips of a certain nickel steel alloy which has the unusual property that its stiffness increases with temperature, to form a constant stiffness spring. These methods are not wholly satisfactory for applications where the range of temperatures encountered is wide, or where high accuracy is required. They also have the disadvantage that they are restricted to the use of a few special materials, which means that they are limited by the properties of these particular materials. Thus, many other versatile materials, with generally superior spring properties, or materials with superior characteristics at high temperature are excluded from use in the above approaches.

My invention overcomes many of the prior disadvantages and avoids the requirement of empolying spring materials having special properties. My invention promotes the accuracy of spring-containing instruments especially at temperatures of 500° F. or over where rapid deterioration of spring stiffness has been a basic limitation in high temperature applications. My spring devices will find particular utility in high temperature accelerometers, vibration isolation mounts, and the like.

I have found that the temperature variations which effect the Young's modulus of rigidity of the spring material, may be employed to change the geometry or free length of the spring element. In this manner the differential thermal expansion of the spring material and another material can be used to compensate for the change in the Young's modulus of the spring material and to maintain constant spring stiffness. My method provides theoretically perfect compensation over a range of temperatures limited only by whatever material is chosen for the spring.

Accordingly it is an object of my invention to provide a means for minimizing the variation of spring stiffness with temperature over an extreme range of temperatures.

Another object of my invention is to provide a means for minimizing the variation of spring stiffness with temperature, in which a wide variety of spring materials may be used.

Another object of my invention is to provide a means of minimizing the temperature-induced error in a force, pressure, or acceleration transducer output, or for minimizing temperature-induced variation of the natural frequency of a frequency standard.

A further object of my invention is to provide a means whereby the stiffness of a spring may be intentionally designed to vary in a predetermined manner with temperature.

Further objects and advantages of my invention will be apparent to those skilled in the art from the following descriptions and drawings, wherein:

FIGURE 1 shows a side elevation view of a compensated spring device, where the device is mounted in an instrument housing, and provided with an electrical pick-off, such as would be found in an acceleration, force or pressure transducer.

FIGURE 2 is a top plan view of FIGURE 1.

FIGURES 3a and 3b illustrate a top sectional view of a spring device to show the manner in which the free length of the spring of FIGURES 1 and 2 changes with temperature.

Figure 4:
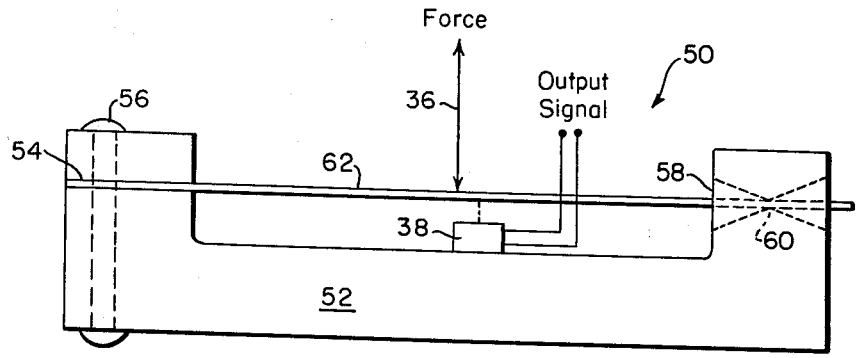
FIGURE 4 is a side elevation of a compensated spring device illustrating another embodiment for employing my spring compensation technique.

FIGURES 1 and 2 show a compensated spring device 10 including an external housing shell 12, and a first rectangular upper expander block 14 and a second rectangular lower expander block 16 of similar dimensions. A flat spring 18 is sandwiched between blocks 14 and 16 with a cantilever 20 extending beyond the mating flush ends of the blocks 14 and 16. The spring is characterized in shape in this embodiment by a rectangular flat body 22 having the width of the expander block 14 and a narrower flat rectangular base 24 which extends beyond the end of the blocks 14 and 16 and is the cantilever 20 which is joined to the spring body 22 by a curved concave root section 24. Blocks 14 and 16 rest on mounting block 26 which extends slightly beyond the end of the cantilever 20 which block 26 rests and is secured to the housing 12. Blocks 14, 16 and 26 and the spring 18 are secured at one end thereof to the housing 12 by a two headed pin 28 which extends through a slot 30 in the one end of each element secured. The assembly is secured within the housing 12 at other locations by strong preloaded curved springs 31, 32 and 33 secured to the housing by pins 34, 35 and 37 and having a free end exerting a holding compressional force on the top and sides of the expander blocks 14 and 16.

Expander blocks 14 and 16 are preselected of a similar material which has a higher coefficient of thermal expansion than the material use for the spring 18 and block 26. The vector line 36 schematically represents any deflecting force on the cantilever 20 such as would arise from an accelerating mass, a pressure, or a weight applied at a predetermined point near the tip of the cantilever 20. The force shown is acting on the cantilever 20 normal to the flat horizontal position of the cantilever. Any suitable measuring device 38 such as an electrical pick off arrangement secured to block 26 and schematically illustrated may be employed to convert the deflections of the cantilever 20 due to the variation in force 36 into a useable mechanical or electrical signal output. For example the sensing device 38 may comprise a measurement of capacitance, resistance, inductance, or radiation flux by means attached to the cantilever 20. The device 10 as shown in FIGURES 1 and 2 could for example be employed as a high temperature accelerometer.

The technique by which the spring geometry is changed with temperature, so as to minimize the variation in spring stiffness with temperature, will now be explained with the help of FIGURES 3a and 3b. FIGURE 3a shows a top partial sectional view of the spring device 10 at some low temperature such as room temperature. As the environment temperature of the device 12 increases, all the materials will increase in length. Since the material for the upper and lower expander blocks 14 and 16 is selected to have a greater coefficient of thermal expansion than the material of the spring 18, the expander blocks 14 and 16 exhibit a greater increase in length than the spring 18, even though the total length of the spring is initially longer than the blocks 14 and 16. In designing the assembly 12 a minimum ratio of the length of the expander blocks to the length of the spring is determined, on the basis of their known different coefficients of thermal expansion, in order to insure that the blocks will exhibit the greater change in length. With the spring 18 and the expander blocks 14 and 16 secured at one end and the increase in the length of the blocks being greater than the increase in length of the spring, the cantilever 20 becomes shorter in length with increasing temperature. Thus the cantilever 20 having a length 40 at one temperature has a shorter length 42 at a higher temperature as shown in FIGURES 3a and 3b, in which the expansions are greatly exaggerated for purposes of illustration. It is well known that the stiffness of a cantilever spring, such as 20, increases rapidly as its free length is shortened, since the stiffness of such a spring is inversely proportional to the cube of its length. Thus as shown the increase in temperature brings about a stiffer spring geometry. As for most materials if the stiffness of the spring material chosen decreases with increasing temperature the increasing stiffness of the spring geometry will have the effect of compensating for the loss in stiffness of the spring material, so that variation in the stiffness of the spring 18 with temperature is minimized by the shortening of the cantilever 20.

The mounting block 26 which supports the electrical pick-off assembly 38 and is of the same material as the spring 18 or which is of a material having about the same coefficient of thermal expansion as spring 18 serves to eliminate a pick-off error that would otherwise result from different rates of expansion of the spring and the material supporting the deflection measuring or pick-off assembly 38. Since the block 26 and the spring 18 are rigidly attached by 28 at the one end and the tip of the free end of the cantilever 20 and the location of the pick-off 38 are at the same distance from the attachment 28 the pick-off assembly 38 does not move relative to the force measuring area or tip of the cantilever 20 in the longitudinal direction. If the pick-off assembly 38 were mounted directly on a housing 12 of different material from the spring 18, an error in pick-off output with change in temperature might occur.

Since the technique is intended to be adaptable to high temperature applications, where rigid attachment of unlike materials may introduce dangerous stress levels, the component parts are secured to each other in a manner that allows all the materials to expand at low stress levels. The stiff, pre-stressed top spring 32, shown in FIGURE 1, and the similar side springs 31 and 33 shown in FIGURE 2, serve to hold securely the blocks and the spring 18. These springs, although of more than adequate stiffness to hold the assembly of 14, 16, 18 and 26 in place against acceleration of the deflecting load 36 on cantilever 20, are not stiff enough to cause undesirable high stress levels. The slot 30 which accommodates the pin 28, serves to secure the one end of the block assembly against longitudinal motion while at the same time permitting the assembly to expand in a lateral direction without causing undue stresses in the housing 12.

If the material chosen for spring 18 has the unusual property of increasing in stiffness with temperature, such as for example pyrolytic graphite and certain nickel steel alloys, the resulting temperature-induced error can be minimized by lengthening the cantilever 20 with increasing temperature. This can be achieved by selecting expander blocks 14 and 16 with a lower thermal expansion coefficient than the spring 18.

FIGURE 4 shows a spring device 50 for increasing the free length of the spring with increasing temperature. In this embodiment there is provided a U-shaped expander block 52 and a flat spring 54 with the block material having a higher coefficient of thermal expansion than the spring material. The spring 54 is sandwiched in one U leg of the block 52 and secured by a pin 56. The other end of the spring 54 extends through a converging-diverging opening 58 in the other U leg of the block 52 and rests on a pivot or supporting point 60 within the leg. The opening 58 permits the spring 54 to expand and contract freely with temperature changes. A deflecting force 36 is applied a predetermined distance from the secured end of the spring 54 on the free length of the beam 62, with an electrical measuring apparatus 38 mounted on the block 52 to convert the deflection and changes thereof into an output signal. As shown, as the temperature increases the beam 62 increases in free length as the block 52 expands.

Figure 5A:
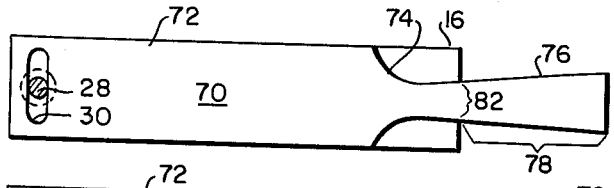
FIGURES 5a and 5b show a top sectional view of a modification of the compensated spring device, to illustrate the manner in which both the length, and the average width of a cantilever spring, may be varied with temperature.
Figure 5B:
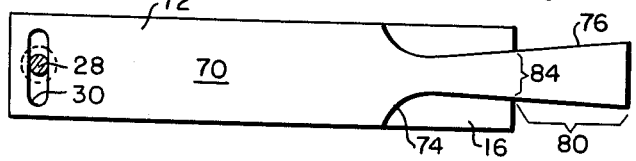

FIGURES 5a and 5b illustrate a modification in which the geometrical stiffness is altered not only by a change in length of the cantilever or free length, but also by a change in the lateral dimensions of the extending section of the spring.

FIGURES 5a and 5b show a top partial sectional view of the spring device 10 modified by employing a flat spring 70 having the usual rectangular base 72, and a curved root section 74, joined to a widening flat diverging sloping curved section 76 which forms the cantilever or free length of the spring 70. At one temperature such as ambient temperature the spring will have a cantilever length of 78 and a lateral width 82 at the horizontal plane where it emerges from the first and second expander blocks 14 and 16. With the blocks 14 and 16 having a higher coefficient of thermal expansion than the spring 70 at a higher temperature the cantilever length will have a shorter length 80 while the lateral width at the one or nonsecured end of the blocks 14 and 16 will increase to a width 84. The lengths shown in FIGURES 5a and 5b are greatly exaggerated for the purposes of illustration.

This modification in spring form permits more compensation for a given length of the expander blocks 14 and 16. By using this configuration, shorter length expander blocks may be used to achieve the same amount of compensation as the configuration of FIGURES 1, 2, 3 and 4. By proper selection of the curvature 76 with length and, based on knowledge of the properties of the materials chosen for the expander blocks 14 and 16, the spring 70 and the temperature range of interest, perfect theoretical compensation can be obtained, provided only that the spring remains an elastic material in the desired temperature range. Where desired the extending cantilever section can be of a diverging curved section etc. Another advantage of the configuration of FIGURES 5a and 5b is that the change in geometrical stiffness of the spring is rapid enough to provide effective compensation for the situation where the cantilever is loaded in torsion. Thus the device is also applicable to a torsion bar type of spring.

The compensating spring device of my invention may be used as one or more component parts of a complete spring, such as a spiral spring, or a helical spring. Degradation in stiffness of the free segments of such springs with temperature may be compensated for by overcompensating the geometrical stiffness of those segments associated with the expander blocks.

My spring devices have the capability of increasing the geometrical stiffness at such a rate as to overcompensate for the degradation in material stiffness. By selecting a curvatrue of the cantilever of the spring the spring stiffness may be programmed as a function of temperature. The sandwich spring has been shown in various forms, however it is recognized that the spring may have other forms such as a flat narrow or wide rectangular form, a narrow rectangular base, a converging tapered root and a wider rectangular cantilever, etc. Also a spring device with two tapered cantilever extensions may be employed, one at each end of the blocks and instead of being attached to the blocks at one end the spring may be attached at the center of the blocks. This configuration is adaptable for the applications where the spring device is used as a segment of a longer spring such that the stiffness compensation technique as described can be applied to various types of longer springs.

My invention therefore provides a means of compensating, or undercompensating or overcompensating if desired, for spring stiffness with a change in temperature. My invention will find particular utility at temperatures of from 500° to 1000° or higher, and where accurate deflection force measurements are required under varying temperature conditions.

Inasmuch as many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language in the following claims is intended to cover all of the generic and specific features of the invention herein described and all statements of the scope of the invention which, as a matter of language, might be said to fall therebetween.

Having thus described my invention, I claim:

1. A temperature compensated spring device for measuring a deflecting force which device includes: a housing; a spring assembly including a spring sandwiched between a pair of expander blocks; one end of the spring and blocks being secured to the housing and the other end of the spring extending beyond the blocks to form a cantilever against which a deflecting force is to be applied; and a means to sense the movement of the cantilever as a measure of the deflecting force on the cantilever, the spring and blocks having different coefficients of thermal expansion whereby the change in geometric stiffness of the cantilever is controlled with a change in temperature.

2. A device as described in claim 1 wherein the device includes additionally a mounting block secured at the one end to the expander blocks and the housing and extending beyond the end of the cantilever, and on which is mounted the sensing means, the mounting block having a similar coefficient of thermal expansion as the spring, whereby the sensing means and spring move in a similar relationship.

3. A device as described in claim 1 wherein the blocks have a higher coefficient of thermal expansion than the spring whereby the stiffness of the cantilever increases with increasing temperature.

4. A device as described in claim 1 wherein the sensing means is an electrical pickup assembly which converts the movement of the end of the cantilever by the deflecting force into an electrical output signal.

5. A device as described in claim 1 wherein the spring is a flat element having a tapered cantilever whereby the root width changes with a change in temperature.

6. A temperature compensated spring device for measuring a deflecting force on the cantilever of the spring which device includes: a housing; a spring assembly to include a flat spring sandwiched between a pair of expander blocks, the blocks having a higher coefficient of thermal expansion than the spring, the spring secured at the one end to the blocks and to the housing, the other end of the spring extending beyond the edge of the blocks to form a cantilever; a mounting plate secured at the one end to the spring assembly and to the housing, said spring and mounting block having a similar coefficient of thermal expansion; means to secure the spring assembly within the housing; means to provide a deflecting force to be measured, said force being applied at the end of the cantilever; and means mounted on the mounting block to convert the movement of the end of the cantilever by the deflecting force measured into an electrical output signal.

7. A temperature compensated spring which includes: a flat spring sandwiched between a pair of blocks, said spring having a diverging tapered cantilever extending from said blocks whereby the root width increases with increasing temperature, said blocks having a higher coefficient of thermal expansion than the spring, one end of the spring being secured to the end of the blocks and the other end of the spring extending beyond the blocks to form said cantilever whereby as the temperature increases the dimensions of said cantilever changes to control the stiffness of the cantilever.

References Cited by the Examiner

UNITED STATES PATENTS

| | | | |
|---|---|---|---|
| 1,393,828 | 10/21 | Reichmann | 177—226 X |
| 2,319,299 | 5/43 | Converse | 73—141 |
| 3,005,332 | 10/61 | McClintock | 73—1 |
| 3,010,314 | 11/61 | Fluur et al. | 73—141 |

RICHARD C. QUEISSER, *Primary Examiner.*